B. F. MULL.
Implement for Grappling, Withdrawing, and Perforating
Pipes and Tubes in Artesian-Wells.
No. 220,542. Patented Oct. 14, 1879.
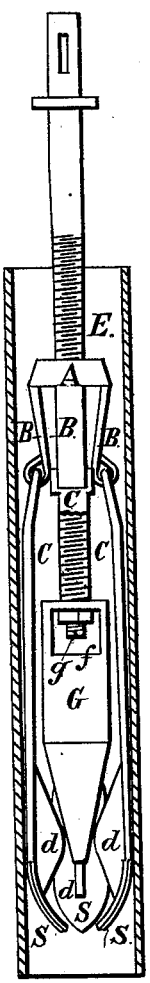
Witnesses:
W. Floyd Duckett
D. B. Lawler
Inventor:
Benjamin F. Mull
per Jno. L. Boone
Attorney

UNITED STATES PATENT OFFICE.

BENJAMIN F. MULL, OF MERCED, CALIFORNIA.

IMPROVEMENT IN IMPLEMENTS FOR GRAPPLING, WITHDRAWING, AND PERFORATING PIPES AND TUBES IN ARTESIAN WELLS.

Specification forming part of Letters Patent No. 220,542, dated October 14, 1879; application filed August 4, 1879.

*To all whom it may concern:*

Be it known that I, BENJAMIN F. MULL, of the city and county of Merced, in the State of California, have invented an Improved Implement for Grappling, Withdrawing, and Perforating Pipes and Tubes in Artesian Wells; and I do hereby declare that the following is a full, clear, and exact description thereof, reference being had to the accompanying drawings.

My invention relates to an implement which can be inserted into a pipe or tube and expanded against its sides, so as to grapple it with sufficient force to resist a pressure that will drive the pipe or tube into a bored hole in the earth, or to withdraw it therefrom.

My grappling implement is more especially useful for forcing down the tube which forms the curb of artesian wells into the hole after the hole is bored by the drill, and for withdrawing any tubes that become lodged, or otherwise rendered unfit for use. It is also used for restoring battered or bent pipes or tubes to a tubular or cylindrical form, for boring holes in pipes or tubes, and for many other purposes hereinafter more fully described.

Referring to the accompanying drawings, in which Figure 1 is a side view of my improved grappling implement inserted in a section of pipe, and Figs. 2 and 3 are detached views, let A represent the head of the implement, which is provided with four rigid pendent arms, B, one at each quarter. To the extremity of each arm B, I hinge a narrow plate, C, the lower end, S, of which is widened and formed like a spoon. On the inside of each spoon-shaped end is a lug, $d$, the upper portion of which is inclined, as shown.

E is a screw which passes down through the head A, and has a four-sided wedge, G, attached to its lower end below the head, so that the screw can rotate without rotating the wedge and yet carry the wedge up or down according to the direction in which the screw is rotated.

In the present instance a mortise, $f$, is made through the upper end of the block or wedge, and a hole is made through the end of the wedge into the mortise. The lower end of the screw-rod is turned down smaller than the main length of the rod, and the end of this reduced portion $g$ is cut with screw-threads. This reduced end is then passed through the hole in the end of the wedge, so that the threaded portion projects into the mortise. A nut is then turned on the threaded end, thus attaching the wedge to the screw-rod, so that the rod can turn without turning the wedge. Now, when the implement is inserted in a pipe or tube, and the screw-rod is turned so as to carry the wedge downward, the point of the wedge is forced between the inclined lugs $d$, so as to crowd the lower ends of the hanging or hinged arms outward against the sides of the tube with a pressure corresponding to the force employed to turn the screw-rod; but when the wedge is raised the arms close together, so that the implement can be withdrawn from the pipe or tube. Two or more hinged arms can be thus employed; but I prefer to use four, and they might be hinged directly to the head, and thus do away with the rigid pendent arms B.

The shape of the lower end of the pendent arms is not material, as various arrangements could be employed to adapt the implement to the work it has to do; but I prefer the spoon-shaped ends with curved points, because they make the entire implement pointed in a measure, so that it will enter the end of a pipe that has been battered or acted on so as to reduce its diameter.

The backs of the spoon-shaped ends S can be milled or roughened, so as to give them a better hold on the sides of the tube when they are expanded against it, and where the pipe or tube is too large in diameter for the size of the implement I can increase the diameter of the lower end of the implement to fit it by attaching independent pieces of wood or metal to the backs of the spoon-shaped ends.

In boring artesian wells it sometimes occurs that after the main curb has been forced down as far as it will go, it is necessary to commence a smaller hole in the bottom of the well. This grappling-iron is extremely useful for putting the tube or curbing in place in some cases, as it enables me to handle the tubes with the greatest ease. For instance, to drive a section of tubing down into the bore or drill-hole, I insert the implement into the tube and expand the arms so that they grapple it with the required force. I then attach extension-rods to the upper end of the screw-rod E, and crowd the tube down into the bore, using as great force as is necessary, and the grappling-iron will not slip. To withdraw a tube from the well I lower the grappling-iron into the well until it enters the section or tube, and then expand it so as to gripe the tube. I then hoist away, and the section or tube is drawn out.

If the end of a tube that is down in the well becomes battered by the sand-pump or by other causes, I can restore it to its original size by lowering the implement until its pointed lower end enters the contracted portion. Then by a few blows delivered by raising and dropping the implement the battered portions will be forced outward to their proper places. If a tube should become indented at any point in its length, I can insert the instrument, and by expanding it against the indented part restore it to its original form.

In case the roughened backs of the spoon-shaped ends or grapplers S should not have sufficient gripe on the inside surface of the tube to hold against the pressure necessary to drive or extract the tube, I shall form a shoulder or projection on the back of the spoon-shaped ends S, and expand the arms so that the projection will catch on the edge of the pipe. This will give a positive gripe; but usually the friction-gripe will be sufficient.

By securing a bit, $p$, in one or more of the spoon-shaped ends S, so that it will project from its outside face of the spoon, as shown at Fig. 3, I can, by lowering the implement down into the well, perforate the tube or casing at any desired point by expanding the arms so as to force the bit through the pipe or tube. This often becomes necessary, in order to admit water into the well from a water-bearing stratum that has been passed through in sinking the well.

Having thus described my invention, what I claim, and desire to secure by Letters Patent, is—

In a pipe or tube expander, the combination, with the screw-rod E, provided with the wedge G, of the mandrel, consisting of the arms C, connected to a sliding head, A, on the rod E, and provided on their inside with inclined lugs $d$ and with spoon-shaped lower ends, S, adapted by the action of the wedge to fill the pipe or tube, for removing indentations therein and for effecting its removal, &c., substantially as and for the purpose set forth.

In witness whereof I have hereunto set my hand and seal.

BENJAMIN F. MULL. [L. S.]

Witnesses:
W. F. CLARK,
D. B. LAWLER.